United States Patent [19]

Stobbs et al.

[11] Patent Number: 5,178,359
[45] Date of Patent: Jan. 12, 1993

[54] PORPORTIONAL PRESSURE CONTROL VALVE

[75] Inventors: Thomas J. Stobbs, Brookfield; Glen W. Trickle, Elm Grove, both of Wis.

[73] Assignee: Applied Power Inc., Butler, Wis.

[21] Appl. No.: 802,019

[22] Filed: Dec. 3, 1991

Related U.S. Application Data

[63] Continuation-in-part of Ser. No. 534,386, Jun. 7, 1990, Pat. No. 5,069,420, which is a continuation-in-part of Ser. No. 477,026, Feb. 8, 1990, Pat. No. 5,067,687.

[51] Int. Cl.$^5$ .............................................. F16K 31/40
[52] U.S. Cl. .................................. 251/30.02; 251/43; 251/129.08; 251/129.1; 137/454.5
[58] Field of Search ............ 251/30.01, 30.02, 129.08, 251/30.03, 129.1; 137/625.64, 625.66, 454.5, 454.2

[56] References Cited

U.S. PATENT DOCUMENTS

| | | | |
|---|---|---|---|
| 4,413,648 | 11/1983 | Walters et al. | 251/129.08 X |
| 4,576,200 | 3/1986 | Janecke et al. | 137/625.64 X |
| 4,676,273 | 6/1987 | Stoltman | 137/625.64 X |

OTHER PUBLICATIONS

"Elektrohydraulische Signalwandler zur Regelung aktiver Fahrwerke", technical paper of Mannesmann Rexroth GmbH, undated, partial translation provided.

*Primary Examiner*—Arnold Rosenthal
*Attorney, Agent, or Firm*—Quarles & Brady

[57] ABSTRACT

A proportional pressure control valve has a metering spool which selectively meters flow between an axial first port and radial second ports. The spool is axially reciprocable with a larger face toward the first port and a smaller face opposite from the first port, with a pressure equalization bore through the spool. A first spring extends between the smaller face of the spool and an armature and the armature is biased to a normal position by a second spring and also has a pressure equalization bore through it. Radial orifices are formed in the end of the armature facing the smaller face of the spool, and the end of the armature seats in the main bore in which the spool is seated. Passageways extend from the orifices to the second ports, and two selectively and variably energizable electromagnetic coils coaxially encircle the armature, one to draw the armature to one side of the normal position and the other to draw the armature to the opposite side. The normal position of the armature preferably biases the spool to an intermediate setting so that energizing the coil which is toward the closed position of the spool stiffens the response to the valve and energizing the coil which is away from the closed position of the spool softens the response of the valve. Energizing one or the other coil also varies the exposed area of the orifices to change the slope of the pressure-flow rate curve at the particular energization level for low flow rates.

24 Claims, 2 Drawing Sheets

PORPORTIONAL PRESSURE CONTROL VALVE

This application is a continuation-in-part of U.S. patent application Ser. No. 07/534,386 filed Jun. 7, 1990, issued Dec. 3, 1991 as U.S. Pat. No. 5,069,420, which is a continuation-in-part of U.S. patent application Ser. No. 07/477,026 filed Feb. 8, 1990, issued Nov. 26, 1991 as U.S. Pat. No. 5,067,687.

FIELD OF THE INVENTION

This invention relates to pressure control devices, and particularly to a compact two-stage pressure control valve which is especially useful in vehicle suspension systems.

BACKGROUND OF THE INVENTION

Hydraulic shock absorbers or suspension dampers are used on vehicles to dampen oscillations caused by uneven road surfaces or vehicle accelerations. Hydraulic dampers absorb vibrational energy using hydraulic principles. Dampers employ a piston within a cylinder, where the damper extends and retracts (compresses) in response to vehicle movements. Fluid is forced through a series of orifices and relief and check valves in order to control the motion of the piston and achieve damping.

Unfortunately, however, such dampers are passive in that the orifices and the relief and check valves produce the same damping characteristics for all road surfaces. Dampers should optimally be able to assume different operating characteristics under varying operating conditions. To correct this shortcoming, vehicle suspension systems have incorporated selectable or adaptive control systems. In these systems, the vehicle operator is able to select between firm or soft suspension ride modes. A small direct current motor within the damper opens or closes a valve which operates in parallel with the standard orifices and relief valves within the damper. As a result, the vehicle operator may modify the vehicle ride mode to accommodate personal preference.

Adaptive control is limited, however, because the parallel valving must be set in either a fully on or a fully off position. It would be desirable for the control system to be proportionally controlled, so that the characteristics of the damper could change in relation to real-time varying road conditions. It may also be desirable for the control system to incorporate other factors which may affect the optimal suspension ride mode, such as vehicle speed, load, or the present position of the damper. Additionally, adaptive control systems typically require 0.25 seconds or more for the selected ride mode to take effect. Even if the operator desired to modify the ride mode for a change in road conditions, the selectable system may not be able to respond in time. For example, if the system was set for a soft ride, it may be desired to quickly change it to a firm ride, for example to increase the tire-to-road force when going over a series of bumps so as to improve turning ability or to negotiate a turn so as to prevent the vehicle from rolling.

It is also desirable that a proportional control valve revert to an intermediate setting should a failure, such as a loss of power, occur. Reverting to a firm ride may result in discomfort to the vehicle occupants and reverting to a soft ride may result in reduced control over the vehicle. Moreover, it is desired that a proportional control valve be energy efficient, and consume as little electrical power in operation to produce a given suspension mode as possible.

SUMMARY OF THE INVENTION

The invention provides a proportional pressure control valve having a housing with a first port and a second port. A metering spool within the housing provides a variable restriction between the first port and the second port and is movable between an infinite number of positions, the position of the metering spool determining the size of the restriction between the first and second ports. The spool is subjected to a pressure feedback force and is moved between the positions so as to vary the size of the restriction by power operated means. Means are provided for placing the first port in communication with the second port bypassing the restriction. Thereby, flow is provided through the valve between the first and second ports bypassing the restriction, which enables the valve to be adapted to specific applications at relatively low pressures and flow rates.

In an especially useful form, the means for providing communication between the first and second ports includes a variable orifice. By selectively varying the size of the orifice, the low flow, low pressure characteristics of the valve can be altered according to changing conditions. Thus, the size of the orifice can be reduced to produce a relatively high slope of the pressure-flow rate curve or it can be increased to produce a relatively low slope of the pressure-flow rate curve. In an especially preferred form, the power operated means includes an armature and the orifices are defined at least in part by an armature. Therefore, moving the armature varies the exposed area of the orifices, which varies the low pressure, low flow characteristics of the valve.

In another aspect, first biasing means connects the armature and the metering spool. Thereby, the armature can be moved to vary the biasing force exerted on the metering spool. If the first biasing means is a compression spring, then moving the armature toward the metering spool reduces the spring cavity in which the compression spring resides, which increases the spring force on the metering spool biasing the spool into the sealing position. Therefore, a higher pressure will be required to move the spool to increase the opening of the variable restriction or to maintain the spool at a given position. If moving the armature toward the metering spool also reduces the size of the orifices, then the slope of the pressure-flow rate curve at low pressure, low flow will be increased, so that the valve will respond relatively stiffly up to a relatively high pressure.

Conversely, moving the armature in the direction away from the metering spool increases the size of the spring cavity in which the compression spring resides, which reduces the pressure required to increase the size of the restriction or to maintain the spool at a given position. If moving the armature as such also increases the size of the orifices, then the slope of the pressure-flow rate curve at low pressure, low flow will be reduced, so that the valve will respond relatively softly up to a relatively low pressure, and may not change much in response, if at all, when the metering spool opens.

In an especially useful form, the power operated means further comprises a second biasing means which biases the armature to a normal position in which the metering spool is in a normal biased state. The normal position of the armature places the orifices at an intermediate position of being open, i.e., moving the armature in one direction will increase the exposed area of the orifices and moving it in the opposite direction will reduce the exposed area of the orifices. Also, in the normal biased state of the metering spool, moving the armature from the normal position in one direction will reduce the biasing force on the metering spool and moving the armature in the other direction will increase the biasing force on the metering spool.

In another aspect, an electromagnetic driver is mounted in the housing and has first and second electromagnetic force sources which act on the armature. Each of the electromagnetic force sources is operable to receive a variable input current and to establish a magnetic flux path through the armature to move it in one direction or the other, depending upon which force source is energized. The strength of the magnetic flux path generated by each source is substantially proportional to the variable input current. Means connect the armature and the metering spool so that the armature and metering spool move relative to one another according to a function which is dependent in part upon the pressure at the first port and the armature is biased to a normal position in which the connecting means is in a normal state. Thereby, the armature is moved one way or the other from the normal position, depending upon which force source is energized, to vary the force exerted on the metering spool, which varies the pressure in the first port required to open the metering spool and the degree of opening caused by a given pressure. If the movement of the armature also varies the exposed opening of an orifice connecting the first and second ports, then energization of one force source or the other, and the magnitude of the energization, can be selected to vary the low pressure, low flow characteristics of the valve.

The foregoing and other objects and advantages of the present invention will appear from the following description.

the valve of

Figure 1:
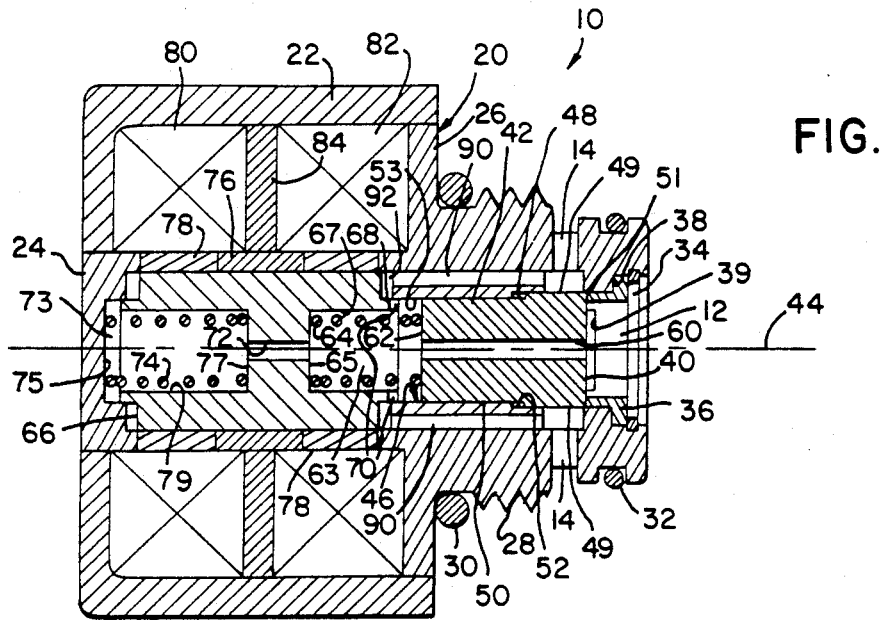
FIG. 1 is a sectional view of a proportional pressure control valve of the invention.
Figure 2:
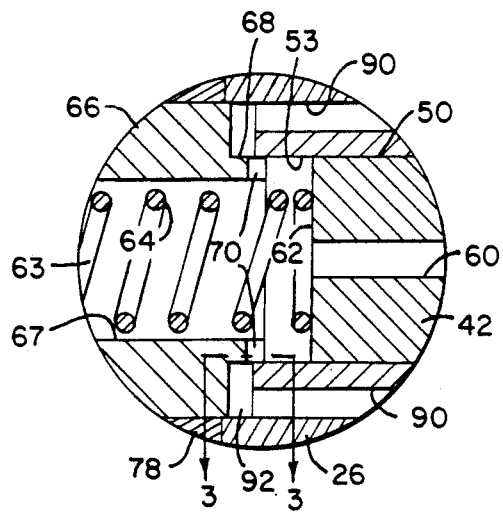
Figure 3A:
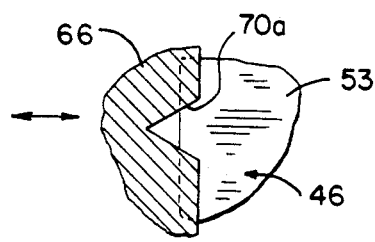
Figure 3B:
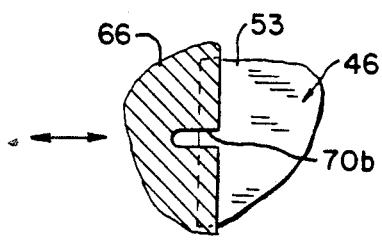
Figure 4:
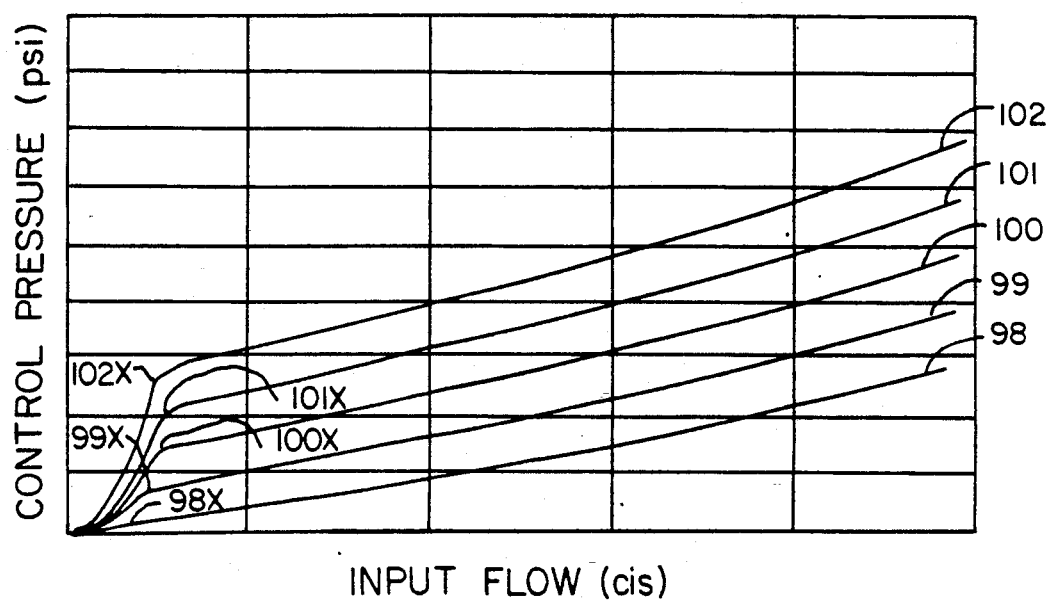
Figure 5:
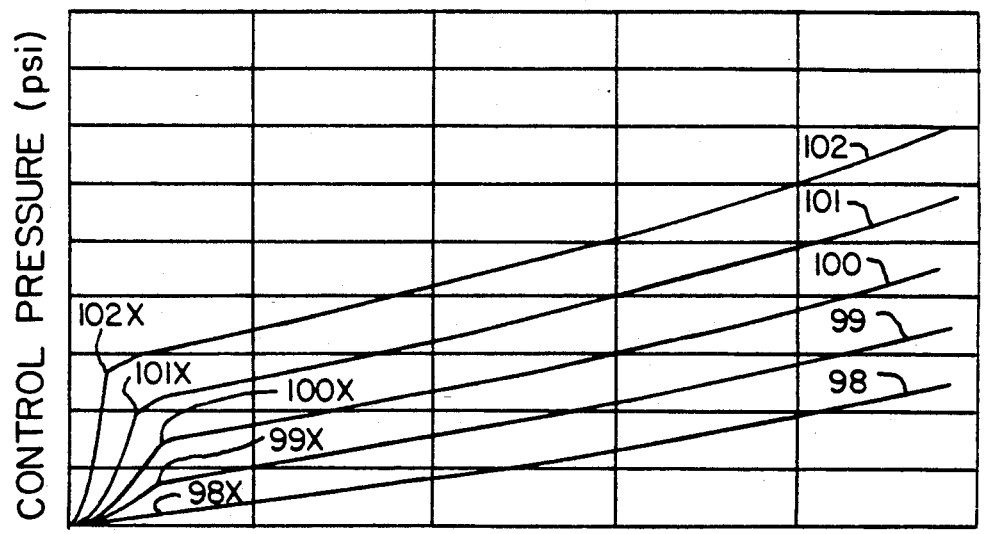

FIG. 2 is a detail view of orifices for FIG. 1;

FIG. 3a is a sectional view taken along the plane of the line 3—3 of FIG. 2 showing an orifice for the valve of FIG. 1;

FIG. 3b is a view similar to FIG. 3a but showing an alternate orifice for the valve of FIG. 1;

FIG. 4 is a graph showing the relationship between pressure differential and flow rate at varying current levels for the embodiment of the invention shown in FIG. 3a; and FIG. 5 is a graph showing the relationship between pressure differential and flow rate at varying current levels for the embodiment of the invention shown in FIG. 3b.

DETAILED DESCRIPTION OF THE PREFERRED EMBODIMENTS

Proportional pressure control valves of the type disclosed herein are for use in a shock absorber or suspension damper of the type and in the manner described in U.S. patent application Ser. No. 07/534,386, filed Jun. 7, 1990, entitled "Proportional Pressure Control Valve", issued Dec. 3, 1991 as U.S. Pat. No. 5,069,420, the disclosure of which is hereby incorporated by reference.

Referring to FIG. 1, the valve 10 has a first port 12, which when incorporated in a damper of the type disclosed in U.S. Pat. No. 5,069,420 would be in fluid communication with a bypass chamber (ref. no. 311 in U.S. Pat. No. 5,069,420) of the damper. A series of radial second ports 14, two of which are shown in FIG. 1, would be in fluid communication with an equalization chamber (ref. no. 312 in U.S. Pat. No. 5,069,420) of the damper when the valve 10 is incorporated in such a damper. Therefore, flow through the valve is normally from the first port 12 to the second ports 14. In this way, the valve 10 may be used to control the damping characteristics of the damper since hydraulic fluid passing from the bypass chamber to the equalization chamber passes through the valve 10. Reducing the fluid flow rate through the valve 10 stiffens the damper and increasing the fluid flow rate softens it.

The valve 10 includes a housing 20 which in the preferred embodiment disclosed includes a driver cup 22, a plug 24 and a valve body 26. The plug 24 and valve body 26 are press fit or otherwise secured to the cup 22 to form a fluid tight seal therebetween, and the cup 22, plug 24 and valve body 26 are all made of ferrous materials, in which a magnetic field may be induced.

The valve body 26 has threads at 28 which are analogous to the threads 324 disclosed in U.S. Pat. No. 5,069,420, referred to above. The threads 28 are for engaging internal mating threads on a damper so as to mount the valve 10 on the damper. An O-ring 30 creates a fluid tight seal between the valve 10 and the damper so as to prevent leakage out of the damper past the valve 10 and an O-ring 32 creates a fluid tight seal against a suitable bore in the damper so as to prevent communication between the first port 12 and the second ports 14 past the O-ring 32.

In the first port 12, a spring clip 34 captures a bushing 36 against an internal shoulder 38 formed in the port 12. The bushing 36 extends inwardly to an inward end which forms a stop which abuts against the end 40 of a metering spool 42 to prevent the metering spool 42 from being ejected out the end of the valve body 26 by forces which bias the metering spool 42, further described below. The inward end of the bushing 36 is also formed with an undercut 39, so as to allow unrestricted flow past the bushing 36 when the metering spool 42 is open.

The metering spool 42 is slidable along longitudinal axis 44 within main bore 46 of the valve body 26. The exterior diameter of the metering spool 42 is stepped at shoulder 48, defining at a first side thereof a larger diameter 49 and a smaller diameter 50 at a second side thereof. The internal diameter of the main bore 46 mates with the external diameters of the metering spool 42 in sliding contact, having a larger internal diameter 52 at a first side thereof and a smaller internal diameter 53 at a second side thereof. The second ports 14 open at their inner ends into the larger diameter 52 of the main bore 46.

The larger diameter 52 of the main bore 46 extends rightwardly from the second ports 14 as shown in FIG. 1 and overlaps onto the diameter 49 of the metering spool 42 in a close sliding fit when the metering spool 42 is in the sealing position, which is shown in FIG. 1. In the sealing position of the metering spool 42, only negligible, if any, leakage is allowed from the first port 12 to the second ports 14 past corner 51 of the spool 42, which overlaps onto the portion of the diameter 52 which is rightward of the ports 14. Hydraulic fluid under pressure in the first port 12 can leak in between the bushing 36 and the larger area face 40 of the spool 42 so that the entire area of the face 40 is subjected to the pressure in the first port 12.

A bore 60 extends axially through the spool 42 from face 40 to face 62 at the opposite end of the spool, which equalizes the pressures acting on the faces 40 and 62. Face 62 is smaller than face 40 since it is reduced in diameter by the difference between the diameters 49 and 50. Although the pressures acting on the faces 40 and 62 are substantially equal, since face 40 is larger than face 62, the net force exerted by the pressure in the first port 12 tends to move the spool 42 leftwardly as viewed in FIG. 1, tending to open the seal created by the spool 42 and the main bore 46 between the first port 12 and the second ports 14.

A first spring 64 extends between face 62 and an armature 66, within a first spring cavity 63 defined at one end by an end face 65 of a spring guide bore 67 in the armature 66 and at the other end by face 62. The armature 66 has a ring-shaped spool extension portion 68 of an outer diameter which mates in close sliding contact with the smaller diameter 53 of main bore 46. Orifices 70, two of which are shown, are radially spaced about and formed in the spool extension portion 68. The exposed opening of each orifice 70 is determined by the axial position of the armature 66 along the axis 44. The fit of the spool extension portion 68 in the main bore 46 is such that the only substantial flow is allowed through the exposed areas of the orifices 70.

The armature 66 has an axial bore 72 which equalizes the pressures acting on the opposite ends of the armature 66. A second spring 74 extends between armature 66 and plug 24, within a second spring cavity 73 defined at one end by an inwardly facing surface 75 of plug 24 and at the other end by end face 77 in spring guide bore 79 in the armature 66. The second spring 74 counteracts the force exerted by the first spring 64 on the armature 66 to position the armature 66 in a normal or "off" position as shown in FIG. 1.

The armature 66 is slideably received in a bore defined by a central ring 76 made of a ferrous material and two end rings 78, one on each side of the central ring 76, which are made of non-ferrous materials. Encircling the rings 76 and 78 and received within the cup 22 are two electromagnetic coils 80 and 82. The coils 80 and 82 are separated by an annular ferrous spacer ring 84.

The coils 80 and 82 are like the coils described in U.S. Pat. No. 5,069,420, referred to above, although two coils are provided in the preferred embodiment disclosed herein. Briefly, energizing either coil with a variable direct current produces a magnetic field, the strength of which varies with the amperage of the current. Energizing coil 80 produces a magnetic field which draws the armature 66 leftwardly as viewed in FIG. 1, thereby diminishing the size of spring cavity 73 and increasing the size of spring cavity 63. This movement compresses spring 74 and allows spring 64 to extend, thereby reducing the spring force biasing spool 42 into the sealing position.

Energizing coil 82 rather than coil 80 produces a magnetic field which draws armature 66 to the right as viewed in FIG. 1, thereby diminishing the size of spring cavity 63 and increasing the size of spring cavity 73. This movement compresses spring 64 and allows spring 74 to extend, thereby increasing the spring force biasing spool 42 into the sealing position. Therefore, energizing coil 80 reduces the force exerted by spring 64 on metering spool 42, so that a lower pressure in port 12 will cause metering spool 42 to open to a given open position. Conversely, energizing coil 82 will compress spring 64, thereby exerting a larger force tending to hold the metering spool 42 closed, so that a larger pressure in port 12 will be required to move the metering spool 42 to a given open position.

The position of the armature 66 can be varied by varying the current applied to either the coil 80 or the coil 82. Correspondingly, moving the armature 66 by varying the current applied to the coil 80 or coil 82 will shift the metering spool 42 in position at a given pressure at the first port 12, assuming that the pressure was sufficient to result in the metering spool 42 being open to begin with.

The orifices 70 are in communication with the second ports 14 via passageways 90, two of which are shown, and an annular space 92 in the preferred embodiment. Any system of passageways may be provided to place the orifices 70 in fluid communication with the second ports 14 on one side, and with the first port 12 on the other side.

Referring to FIGS. 2, 3a and 3b, the orifices 70 can be any desired shape, depending upon the response characteristics desired in the valve at low pressures and flow rates, i.e., when the spool 42 is in the sealed position For example, in FIG. 3a, each orifice 70a has a butterfly cross-sectional shape, of a variable area gradient and with its apex at the left. Therefore, for the orifices 70a, the change in area, dA, is relatively large as the armature 66 is shifted to the left, for example by energizing coil 80. Shifting the armature to the left, in addition to increasing the exposed area of the orifices 70a, reduces the pressure at port 12 which is required to open spool 42. Shifting the armature 66 to the right by energizing coil 82 results in a relatively small dA, and in addition increases the pressure required at port 12 to open the spool 42.

The orifices 70a in a valve 10 would produce pressure-flow rate response curves of the general shapes shown in FIG. 4. The central curve 100 shown in FIG. 4 represents the response characteristics with the valve 10 deenergized. Point 100x of curve 100 marks the pressure and flow rate where the metering spool 42 first starts to open, i.e., to move leftward of the sealing position shown in FIG. 1.

At pressures and flow rates below point 100x on curve 100, all flow, disregarding nominal leakage which may occur, is past the orifices 70a. Above the pressure and flow rate at point 100x, the flow is attributable to that through the orifices 70a and also that directly from port 12 to ports 14 past the restriction defined between corner 51 and the inner ends of the ports 14.

Curve 101 represents what the pressure-flow characteristics of the valve 10 with orifices 70a would be with the coil 82 energized at 50% of its maximum current capacity, and curve 102 represents the characteristics with the coil 82 energized at 100% current. Curve 99 represents the pressure-flow characteristics through the valve 10 provided with orifices 70a with coil 80 energized at 50% amperage capacity and curve 98 represents the characteristics at 100%.

FIG. 3b illustrates orifice 70b of an alternate shape. In FIG. 3b, the orifice 70b has parallel sides so that the change dA in exposed area of the aperture 70b is constant regardless of the axial position of the armature 66. In FIG. 3b, the change dA in exposed area of the orifice 70b as the armature 66 moves leftwardly is relatively smaller than the change dA in the exposed area of the orifice 70a shown in FIG. 3a, and the change dA in the exposed area of the orifice 70b is relatively larger than the change dA for orifice 70a as the armature 66 moves rightwardly.

The effect the different area shapes have on the flow characteristics of the valve 10 is illustrated in FIG. 5. In FIG. 5, as in FIG. 4, curve 100 illustrates the deenergized state of the valve, with curves 101 and 102 representing coil 82 50% and 100% energized, respectively, and curves 99 and 98 representing coil 80 50% and 100% energized, respectively. The primary difference between FIGS. 4 and 5 is in the shape and positioning of the curves for low pressures and flow rates, i.e., the positioning of points 98x-102x and the shapes of the curves below those points.

As can be seen, the curves below points 98x-102x in FIG. 5 are more fanned out and spaced apart than are the corresponding curves in FIG. 4. Since under many driving conditions the metering spool 42 remains in the sealed position of FIG. 1, the flow characteristics of the valve 10 below points 98x-102x are extremely important. The curves of FIG. 5 represent a broader range of control between a "soft" and a "firm" response than the curves of FIG. 4, and for that reason may be desirable in some applications. Thereby, providing a variable orifice on the armature 66 allows tailoring the flow characteristics at relatively low pressures and flow rates as desired. It should be noted that the invention is not limited to the specific shapes of orifices shown in FIGS. 3a and 3b, but that any shape of orifice could be used to practice the invention.

In the graphs of FIGS. 4 and 5, the curve 100 represents the characteristics when the valve is deenergized. Thus, the curve 100 is at an intermediate valve setting, representing the approximate mid-point between a firm and a soft setting, with curve 102 being the firmest and curve 98 being the softest. For curve 98, the slope is relatively low below point 98x and there is essentially no change in slope of the curve at point 98x, which is desired for a soft ride. In contrast, curve 100 maintains a high slope until a relatively high pressure at point 102x, where the metering spool opens to produce a relatively sharp change in slope, as is desired for a firm setting.

In the case of a failure, for example loss of power to the valve 10, the valve 10 would revert to the characteristics described by the curve 100. This is desirable because it represents a compromise between a firm setting and soft setting, which is appropriate for general driving conditions.

It should also be noted that the deenergized mode resulting in an intermediate setting provides a more energy efficient valve. For example, at a zero amps current input to the valve, the valve assumes the deenergized, intermediate setting at curve 100. From curve 100, it may take one amp to the coil 82 (with zero amps to the coil 80) for the full firm setting. To go from the deenergized mode of curve 100 to the full soft setting of curve 98, it may take one amp input to coil 80 (with zero amps to coil 82). However, if the deenergized mode was either full firm (curve 102) or full soft (curve 98), then it would take one amp to reach the intermediate setting (curve 100) and two amps to reach the opposite extreme setting.

The foregoing detailed description has been for the purpose of illustration. Thus, a number of modifications and changes may be made without departing from the spirit and scope of the present invention. For example, the orifices 70 could be formed in either the armature, as in the preferred embodiment, or in the wall of the main bore. Also, in the normal state of the metering spool 42, the restriction defined between corner 51 and the inner ends of the ports 14 need not necessarily be completely closed. In addition, there are many different porting and passageway arrangements which could possibly be used in practicing the invention. Therefore, the invention should not be limited by the specific embodiments described, but only by the claims.

We claim:

1. A proportional pressure control valve, comprising:
   a housing having a first port and a second port;
   a metering spool within said housing for providing a variable restriction between said first port and said second port, said metering spool being movable between an infinite number of positions, the position of said metering spool determining the size of said restriction between said first and second ports;
   means for applying a pressure feedback force on said metering spool;
   power operated means for moving said metering spool between said positions so as to vary the size of said restriction; and
   means bypassing said restriction for providing communication between said first and second ports;
   wherein said power operated means includes an armature and first biasing means connecting said armature and said metering spool.

2. A proportional pressure control valve as in claim 1, wherein said means for providing communication between said first and second ports includes a variable orifice.

3. A proportional pressure control valve as in claim 2, wherein said power operated means varies the size of said variable orifice.

4. A proportional pressure control valve as in claim 3, wherein said orifice is defined at least in part by said armature.

5. A proportional pressure control valve as in claim 1, wherein said power operated means further comprises a second biasing means, said second biasing means biasing said armature to a normal position in which said metering spool is in a normal biased state.

6. A proportional pressure control valve as in claim 1, wherein said means for applying a pressure feedback force on said metering spool includes a first surface area on one side of the spool and a second surface area on the opposite side of the spool, said second surface area being smaller than the first surface area.

7. A proportional pressure control valve as in claim 1, wherein one of said positions is a sealing position in which said restriction is closed.

8. A proportional pressure control valve, comprising:
   a housing having a driver cavity, a main bore and first and second ports in communication with said main bore;
   an electromagnetic driver mounted within said driver cavity, said electromagnetic driver having:
   an armature movable within said driver cavity; and
   an electromagnetic force source associated with said armature, said electromagnetic force source being operable to receive a variable input current and to establish a magnetic flux path through said armature to move the same, the strength of said magnetic flux path being substantially proportional to said variable input current; and
   a metering spool positioned within said main bore and movable in an infinitely variable manner between an infinite number of positions, the position of said metering spool determining in part the magnitude of communication between said first and second ports;

means for applying a pressure feedback force on said metering spool including a first surface area on one side of the spool and a second surface area on the opposite side of said spool, said second surface area being smaller than said first surface area; and means for connecting said armature and said metering spool so that said armature and said metering spool move relative to one another according to a predetermined function which is dependent in part upon pressure at said first port;

wherein a passageway is formed in said housing which opens at an orifice into said main bore between said armature and said metering spool and said passageway is communicable with said second port.

9. A proportional pressure control valve as in claim 8, wherein an exposed opening of said orifice is variable and is determined by the position of said armature.

10. A proportional pressure control valve as in claim 8, wherein said orifice is defined in part by said armature.

11. A proportional pressure control valve as in claim 8, wherein the means connecting said armature and said metering spool comprises a first biasing means.

12. A proportional pressure control valve as in claim 11, wherein a second biasing means biases said armature to a normal position in which said metering spool is in a normal biased state under a biasing force exerted by said first biasing means.

13. A proportional pressure control valve as in claim 8, wherein said means for applying a pressure feedback force on said metering spool includes a bore through the metering spool from one side to the opposite side.

14. A proportional pressure control valve, comprising:

a housing having a first port and a second port;

a metering spool within said housing for providing a variable restriction between said first port and said second port, said metering spool being movable between an infinite number of positions, the position of said metering spool determining the size of said restriction between said first and second ports;

means for applying a pressure feedback force on said metering spool;

an electromagnetic driver mounted within said housing, said electromagnetic driver having:

an armature movable within said housing;

a first electromagnetic force source associated with said armature, said electromagnetic force source being operable to receive a variable input current and to establish a magnetic flux path through said armature to move the same in a first axial direction, the strength of said magnetic flux path being substantially proportional to said variable input current; and a second electromagnetic force source associated with said armature, said electromagnetic force source being operable to receive a variable input current and to establish a magnetic flux path through said armature to move the same in a second axial direction opposite to said first axial direction, the strength of said magnetic flux path being substantially proportional to said variable input current;

means connecting said armature and said metering spool so that said armature and said metering spool move relative to one another according to a function which is dependent in part upon pressure at said first port; and means for biasing said armature to a normal position in which said connecting means is in a normal state;

wherein said connecting means includes a first spring.

15. A proportional pressure control valve as in claim 14, further comprising means for providing communication between said first and second ports bypassing said restriction in at least one position of said metering spool.

16. A proportional pressure control valve as in claim 15, wherein said communication providing means includes a variable orifice.

17. A proportional pressure control valve as in claim 14, further comprising means for equalizing a fluid pressure on opposite sides of said armature.

18. A proportional pressure control valve as in claim 14, wherein at least one of said positions is a sealing position in which said restriction is closed.

19. A proportional pressure control valve, comprising:

a housing having a driver cavity, a main bore and first and second ports in communication with said main bore;

an electromagnetic driver mounted within said driver cavity, said electromagnetic driver having:

an armature movable within said driver cavity;

a first electromagnetic force source associated with said armature, said electromagnetic force source being operable to receive a variable input current and to establish a magnetic flux path through said armature to move the same in a first axial direction, the strength of said magnetic flux path being substantially proportional to said variable input current; and a second electromagnetic force source associated with said armature, said electromagnetic force source being operable to receive a variable input current and to establish a magnetic flux path through said armature to move the same in a second axial direction opposite to said first axial direction, the strength of said magnetic flux path being substantially proportional to said variable input current;

a metering spool positioned within said main bore and movable in an infinitely variable manner between an infinite number of positions, the position of said metering spool determining in part the magnitude of communication between said first and second ports;

means for applying a pressure feedback force on said metering spool including a first surface area on one side of the spool and a second surface area on the opposite side of said spool, said second surface area being smaller than said first surface area; and means for connecting said armature and said metering spool so that said armature and said metering spool move relative to one another according to a predetermined function which is dependent in part upon pressure at said first port; and means for biasing said armature to a normal position;

wherein a passageway is formed in said housing which opens at an orifice into said main bore between said armature and said metering spool and is communicable with said second port.

20. A proportional pressure control valve as in claim 19, wherein an exposed opening of said orifice in communication with said main bore is determined by the position of said armature.

21. A proportional pressure control valve as in claim 19, wherein said orifice is defined at least in part by said armature.

22. A proportional pressure control valve, comprising:
- a housing having a driver cavity, a main bore and first and second ports in communication with said main bore;
- an electromagnetic driver mounted within said driver cavity, said electromagnetic driver having:
  - an armature movable within said driver cavity;
  - a first electromagnetic force source associated with said armature, said electromagnetic force source being operable to receive a variable input current and to establish a magnetic flux path through said armature to move the same in a first axial direction, the strength of said magnetic flux path being substantially proportional to said variable input current; and
  - a second electromagnetic force source associated with said armature, said electromagnetic force source being operable to receive a variable input current and to establish a magnetic flux path through said armature to move the same in a second axial direction opposite to said first axial direction, the strength of said magnetic flux path being substantially proportional to said variable input current;
- a metering spool positioned within said main bore and movable in an infinitely variable manner between an infinite number of positions, the position of said metering spool determining in part the magnitude of communication between said first and second ports;
- means for applying a pressure feedback force on said metering spool including a first surface area on one side of the spool and a second surface area on the opposite side of said spool, said second surface area being smaller than said first surface area; and
- means for connecting said armature and said metering spool so that said armature and said metering spool move relative to one another according to a predetermined function which is dependent in part upon pressure at said first port; and
- means for biasing said armature to a normal position; wherein the means connecting said armature and said metering spool comprises a first spring.

23. A proportional pressure control valve as in claim 22, wherein said first spring is held in a normal biased state in the normal position of the armature.

24. A proportional pressure control valve, comprising:
- a housing having a driver cavity, a main bore and first and second ports in communication with said main bore;
- an electromagnetic driver mounted within said driver cavity, said electromagnetic driver having:
  - an armature movable within said driver cavity;
  - a first electromagnetic force source associated with said armature, said electromagnetic force source being operable to receive a variable input current and to establish a magnetic flux path through said armature to move the same in a first axial direction, the strength of said magnetic flux path being substantially proportional to said variable input current; and
  - a second electromagnetic force source associated with said armature, said electromagnetic force source being operable to receive a variable input current and to establish a magnetic flux path through said armature to move the same in a second axial direction opposite to said first axial direction, the strength of said magnetic flux path being substantially proportional to said variable input current;
- a metering spool positioned within said main bore and movable in an infinitely variable manner between an infinite number of positions, the position of said metering spool determining in part the magnitude of communication between said first and second ports;
- means for applying a pressure feedback force on said metering spool including a first surface area on one side of the spool and a second surface area on the opposite side of said spool, said second surface area being smaller than said first surface area; and
- means for connecting said armature and said metering spool so that said armature and said metering spool move relative to one another according to a predetermined function which is dependent in part upon pressure at said first port; and
- means for biasing said armature to a normal position; wherein said means for applying a pressure feedback force on said metering spool includes a bore through the metering spool from one side to the opposite side.

* * * * *